United States Patent [19]

Kawasaki

[11] Patent Number: 5,407,046

[45] Date of Patent: Apr. 18, 1995

[54] TORQUE LIMITER REQUIRING NO PARTS REPLACEMENT OR OIL RESUPPLY ON ITS RESTORATION

[75] Inventor: Toshinobu Kawasaki, Yamatotakada, Japan

[73] Assignee: Koyo Seiko Co., Ltd., Osaka, Japan

[21] Appl. No.: 76,426

[22] Filed: Jun. 14, 1993

[30] Foreign Application Priority Data

Jun. 15, 1992 [JP] Japan .............................. 4-040741 U
Oct. 23, 1992 [JP] Japan .............................. 4-074096 U

[51] Int. Cl.⁶ ................................................ F16D 7/00
[52] U.S. Cl. .................................. 192/56 F; 192/56 R; 464/42
[58] Field of Search .............. 192/56 R, 56 F; 464/42; 403/5, 31

[56] References Cited

U.S. PATENT DOCUMENTS

| | | | |
|---|---|---|---|
| 788,810 | 5/1905 | Ambler | 192/56 R X |
| 2,872,004 | 2/1959 | Barker et al. | 192/56 R |
| 3,111,823 | 11/1963 | Kater | 464/42 |
| 3,751,941 | 8/1973 | Stiff | 464/42 X |
| 4,264,229 | 4/1981 | Falk et al. | 403/5 |
| 4,859,106 | 8/1989 | Elsner et al. | 403/5 |

FOREIGN PATENT DOCUMENTS

| | | |
|---|---|---|
| 470866 | 1/1947 | Belgium . |
| 382147 | 1/1908 | France ............... 192/56 R |
| 1001261 | 10/1951 | France ............... 192/56 R |
| 63-30527 | 6/1988 | Japan . |
| 2023250 | 12/1979 | United Kingdom . |

Primary Examiner—Richard M. Lorence
Attorney, Agent, or Firm—Wenderoth, Lind & Ponack

[57] ABSTRACT

A torque limiter has a shaft member and a cylinder member. A conical outer circumferential surface of the shaft member is fitted to a conical inner circumferential surface of the cylinder member. Top surfaces of convex portions form part of the conical outer circumferential surface, while top surfaces of convex portions form part of the conical inner circumferential surface. When the torque limiter is set up, the convex portions and the convex portions are urged against each other, whereby the cylinder member and the shaft member are frictionally coupled. When the shaft member and the cylinder member rotate relative to each other, the relative rotational position between the convex portions changes, so that the cylinder member and the shaft member are no longer frictionally coupled. Thereafter, when the relative rotational position between the cylinder member and the shaft member is further changed, a concave cam portion of the cylinder member and a convex cam portion of the shaft member come into contact with each other, thereby sliding at least one of the cylinder member and the shaft member in the axial direction. With this arrangement, there is no need to replace parts or to resupply the torque limiter with oil upon the restoration of the torque limiter.

4 Claims, 7 Drawing Sheets

TORQUE LIMITER REQUIRING NO PARTS REPLACEMENT OR OIL RESUPPLY ON ITS RESTORATION

BACKGROUND OF THE INVENTION

1. Field of the Invention

The present invention relates to a torque limiter which requires no parts replacement or oil resupply for its restoration.

2. Description of the Prior Art

Conventionally, in a torque limiter, for example, as shown in FIG. 9, the cylindrical inner circumferential surface of a cylinder member 2 is fitted to the cylindrical outer circumferential surface of a shaft member 1. Oil is supplied to a hydraulic slit 2a of the cylinder member 2, which is sealed by a shear tube 3. An engaging member 4 engageable with an end of the shear tube 3 is secured to the shaft member 1. (See Japanese Patent Publication No. 63-30527.)

The oil under pressure within the hydraulic slit 2a causes the cylindrical inner circumferential surface of the cylinder member 2 to contract so that the cylindrical inner circumferential surface is urged against the cylindrical outer circumferential surface of the shaft member 1. This makes the shaft member 1 and the cylinder member 2 frictionally coupled, allowing a torque to be transmitted therebetween. When a load above a specified value is applied to the shaft member 1 or the cylinder member 2, the shaft member 1 slips relative to the cylindrical inner circumferential surface of the cylinder member 2 such that the shaft member 1 and the cylinder member 2 are rotated relative to one another, and the end of the shear tube 3 is cut off by the engaging member 4, causing the oil within the hydraulic slit 2a to be discharged. As a result, the shaft member 1 and the cylinder member 2 are uncoupled, the torque no longer being transmitted therebetween.

However, in the above conventional torque limiter, not only is the shear tube 3 cut off but the oil within the hydraulic slit 2a is discharged. Therefore, the shear tube 3 must be replaced and oil equivalent to that discharged must be resupplied to the hydraulic slit 2a at the time of restoration.

SUMMARY OF THE INVENTION

The object of the present invention is, therefore, to provide a torque limiter in which parts are not cut off or oil is not discharged upon the operation of the torque limiter, and therefore which requires no parts replacement or oil resupply at the time of its restoration.

In order to achieve the aforementioned object, the present invention provides a torque limiter comprising:

a shaft member having a conical outer circumferential surface;

a cylinder member having a conical inner circumferential surface frictionally couplable to the conical outer circumferential surface of the shaft member and being fitted to the outer circumference of the shaft member; and each of the shaft member and the cylinder member having a respective cam for causing at least one of the shaft member and the cylinder member to slide in the axial direction when the cylinder member is rotated relative to the shaft member, thereby causing the conical outer circumferential surface of the shaft and the conical inner circumferential surface of the cylinder member to be separated from each other in the radial direction.

The cylinder member is preferably provided with a slit which is located radially outwardly of the conical inner circumferential surface of the cylinder member, and which, when supplied with oil pressure, expands so that the conical inner circumferential surface is urged against the conical outer circumferential surface of the shaft member.

Thus, the cylinder member and the shaft member are frictionally coupled. Then, when the relative rotational position between the cylinder member and the shaft member has changed, at least one of the cylinder member and the shaft member is slid axially by the cams so that the conical outer circumferential surface of the shaft member and the conical inner circumferential surface of the cylinder member are separated from each other. As a result, the conical inner circumferential surface of the cylinder member is no longer urged against the conical outer circumferential surface of the shaft member, i.e. the cylinder member and the shaft member are no longer frictionally coupled. Accordingly, the torque is no longer transmitted between the cylinder member and the shaft member.

On the other hand, at the time of restoration, the slit of the cylinder member is opened to relieve the oil pressure; then the conical outer circumferential surface of the shaft member is fitted to the conical inner circumferential surface of the cylinder member; and pressure is applied again to the oil still in the slit. As a result, the conical inner circumferential surface of the cylinder member is urged against the conical outer circumferential surface of the shaft member, causing the cylinder member and the shaft member to be frictionally coupled.

As shown above, according to the present invention, oil is not discharged from the slit upon the operation of the torque limiter. Thus, the torque limiter of the invention requires no parts replacement such as the replacement of a member plugging up the slit and does not require the slit to be resupplied with oil, unlike the conventional torque limiter in which the shear tube is cut off upon the operation of the torque limiter whereby the oil is discharged from the hydraulic slit.

As an alternative, the shaft member is provided with the slit which is located radially inwardly of the conical outer circumferential surface of the shaft member, and which, when supplied with oil pressure, expands so that the conical outer circumferential surface is urged against the conical inner circumferential surface of the cylinder member.

Further, the outer periphery of the shaft member may have a plurality of convex portions, the top surfaces of which extend along a cone and are regularly spaced from each other in the circumferential direction of the conical outer circumferential surface. Thus, these top surfaces of the convex portions form part of the conical outer circumferential surface of the shaft member. The inner periphery of the cylinder member may have a plurality of convex portions, the top surfaces of which extend along a cone and are regularly spaced from each other in the circumferential direction of the conical inner circumferential surface. Thus, these top surfaces of said convex portions form part of the conical inner circumferential surface.

The convex portions of the shaft member and the convex portions of the cylinder member are radially opposed and urged against each other, thus forming frictional coupling portions for causing the shaft member and the cylinder member to be frictionally coupled.

After the convex portions of the shaft member and the convex portions of the cylinder member serving as the frictional coupling portions are released from each other by relative rotation of the cylinder member to the shaft member and when the cylinder member is further rotated relative to the shaft member, the cams make at least one of the cylinder member and the shaft member slide axially so that the convex portions of the shaft member and the convex portions Of the cylinder member are separated from each other in the radial direction.

Further, the shaft member preferably comprises an inner shaft portion which is rotatable relative to the cylinder member and immovable in the axial direction of the shaft member relative to the cylinder member, and an outer shaft portion which is fitted around the inner shaft portion and is axially slidable and non-rotatable relative to the inner shaft portion. In this case, the convex portions of the shaft member are formed on an outer periphery of the outer shaft portion and the cam of the shaft member is provided on the outer shaft portion.

Alternatively, the cylinder member comprises an outer cylinder portion which is rotatable relative to the shaft member and immovable in the axial direction of the cylinder member relative to the shaft member, and an inner cylinder portion which is fitted in the outer cylinder member and is axially slidable and non-rotatable relative to the outer cylinder portion. In this case, the convex portions of the cylinder member are formed on an inner periphery of the inner cylinder portion and the cam of the cylinder member is provided on the inner cylinder portion.

According to the torque limiter of the present invention, the conical outer circumferential surface of the shaft member is fitted to the conical inner circumferential surface of the cylinder member, so that the top surfaces of the convex portions serving as frictional coupling portions of the shaft member and the top surfaces of convex portions serving as frictional coupling portions of the cylinder member are urged against each other. As a result, the cylinder member and the shaft member are frictionally coupled. Then, when the relative rotational position between the cylinder member and the shaft member has changed, the relative rotational position between the convex portions of the shaft member and the convex portions of the cylinder member also changes so that the convex portions are released from each other. As a result, the cylinder member and the shaft member are no longer frictionally coupled. When the relative rotational position between the cylinder member and the shaft member is further changed, at least one of the cylinder member and the shaft member is slid axially by the cams of the cylinder member and the shaft member. As a result, the top surfaces of the convex portions of the shaft member and the top surfaces of the convex portions of the cylinder member are radially separated from each other, causing the cylinder member and the shaft member to be thrown into idle rotation. Thus, the torque is no longer transmitted between the cylinder member and the shaft member.

On the other hand, at the time of restoration, the conical outer circumferential surface of the shaft member is fitted to the conical inner circumferential surface of the cylinder member. In this state, the top surfaces of the convex portions of the shaft member and the top surfaces of the convex portions of the cylinder member are radially opposed to and urged against each other. Thus, the cylinder member and the shaft member are frictionally coupled.

As shown above, according to the present invention, there is no need to resupply the hydraulic slit with oil or to replace parts upon restoration of the torque limiter, unlike the conventional torque limiter in which the shear tube is cut off and oil is discharged from the hydraulic slit upon the operation of the torque limiter.

Further, after the frictional coupling portions are released from each other, the cylinder member or the shaft member is slid by the cams, throwing the cylinder member and the shaft member into idle rotation. As a result, the cams are not subject to an excessive load and thus are prevented from being damaged.

Still further, when the shaft member comprises an inner shaft portion which is rotatable and axially immovable relative to the cylinder member, and an outer shaft portion which is axially slidable and non-rotatable relative to the inner shaft portion, and when the convex portions are formed on the outer periphery of the outer shaft portion, the relative axial position between the cylinder member and the inner shaft portion of the shaft member does not change upon the operation of the torque limiter. Therefore, if a flange portion is provided at one end of the inner shaft portion of the shaft member and a flange portion is provided at the other end of the cylinder member, the spacing between the flange portions remains unchanged upon operation of the torque limiter.

On the other hand, when the cylinder member comprises an outer cylinder portion which is axially unmovable but rotatable relative to the shaft member, and an inner cylinder portion which is axially slidable and non-rotatable relative to the outer cylinder portion, and when the convex portions of the cylinder member are formed on an inner periphery of the inner cylinder portion, the relative axial position between the shaft member and the outer cylinder portion of the cylinder member does not change upon the operation of the torque limiter. Therefore, if a flange portion is provided at one end of the outer cylinder portion of the cylinder member and a flange is provided at the other end of the shaft member, the spacing between the flange portions remains unchanged upon the operation of the torque limiter.

BRIEF DESCRIPTION OF THE DRAWINGS

The present invention will become more fully understood from the detailed description hereinbelow and the accompanying drawings which are not limitative of the present invention, and wherein.

DETAILED DESCRIPTION OF THE PREFERRED EMBODIMENTS (First Embodiment)

Figure 1:
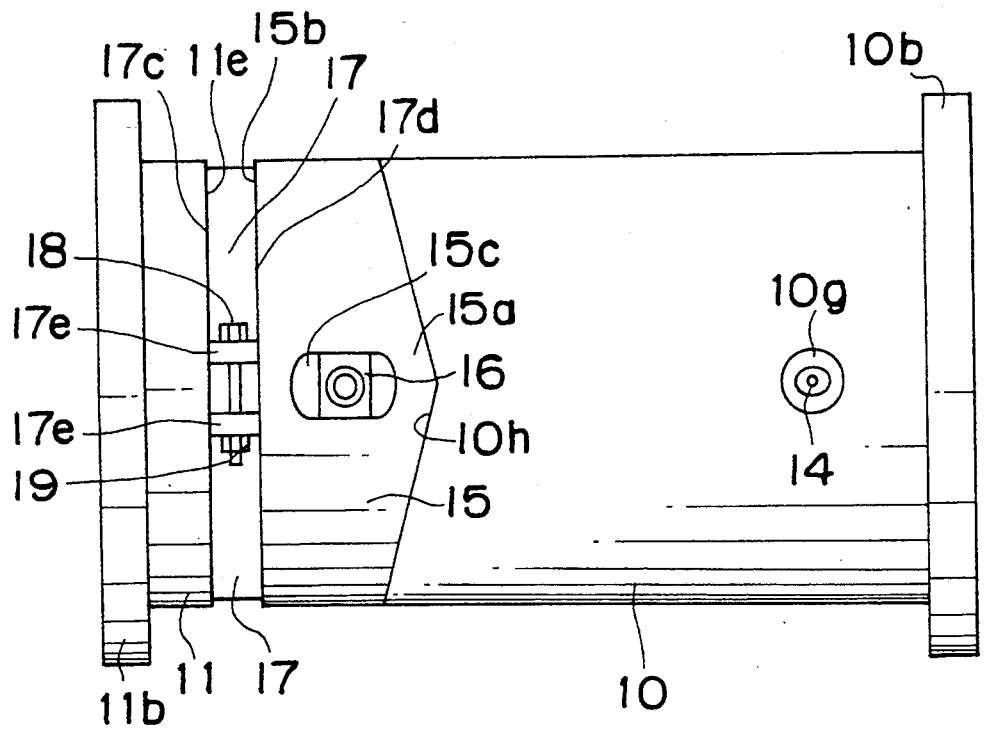
FIG. 1 is a plan view of a first embodiment of a torque limiter according to the present invention.
Figure 2:
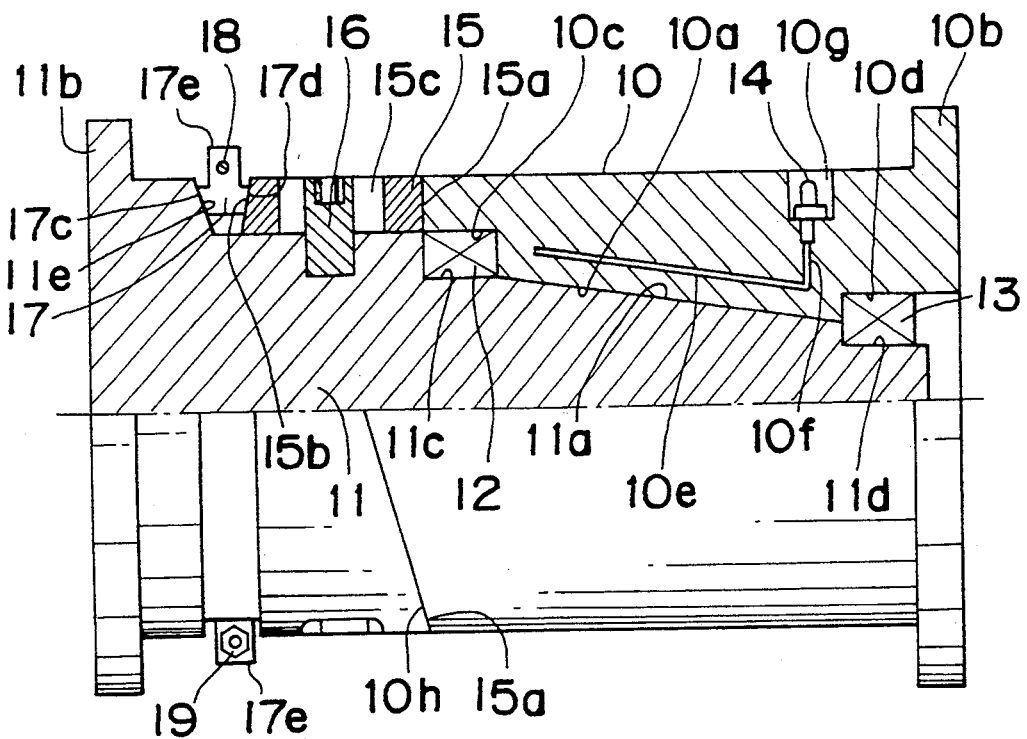
FIG. 2 is a partial sectional view of the first embodiment.

Referring to FIGS. 1 and 2, a first embodiment of the present invention includes a cylinder member 10 having an axially conical inner circumferential surface 10a, and a shaft member 11 having a conical outer circumferential surface 11a to be fitted to the conical inner circumferential surface 10a.

A flange portion 10b is provided at a rear end of the cylinder member 10 shown on the right hand side of FIG. 1. A coupling member (not shown), which is coupled to a driving shaft by a spline, is attached to the flange portion 10b so that the cylinder member 10 is allowed to slide in the axial direction. Further, a flange portion 11b is provided at a front end of the shaft member 11 shown on the left hand side of FIG. 1. A driven shaft (not shown) is coupled to the flange portion 11b.

As shown in FIG. 2, the diameter of the conical inner circumferential surface 10a of the cylinder member 10 decreases in a direction from the front to the rear end of the cylinder member. A groove 10c defined by a cylindrical surface and in which an outer ring of a first bearing 12 is fitted is provided at the inner periphery of the cylinder member 10 adjacent the front end of the conical inner circumferential surface 10a of the cylinder member 10. A groove 10d defined by a cylindrical surface and in which an outer ring of a second bearing 13 is fitted is provided at the inner periphery of the cylinder member 10 adjacent the rear end of the conical inner circumferential surface 10a. The bearings 12 and 13 are so arranged that only their outer ring and rolling elements are separated from the inner ring so as to be movable (slidable) along with the cylinder member 10.

A conical hydraulic slit 10e is formed outwardly from and alongside the conical inner circumferential surface 10a. A plug member 14 is attached at an inlet of a hydraulic passage 10f which extends from the rear end of the hydraulic slit 10e in the radial direction and leads to a recess 10g in the outer circumferential surface of the cylinder member 10. The front end portion of the cylinder member 10 is concave (V-shaped) and is constituted by cam surfaces 10h, 10h which for example, comprise circumferential halves of the front end surface extending from a diametrical line toward the rear end of the cylinder member.

The diameter of the conical outer circumferential surface 11a of the shaft member 11 decreases in a direction from the front to the rear end of the shaft member and is axially fitted to the conical inner circumferential surface 10a of the cylinder member 10. Further, a step portion 11c having a cylindrical surface to which the inner ring of the first bearing 12 is fitted is provided at the outer circumferential surface of the shaft member 11 adjacent the front end of the conical outer circumferential surface 11a. Also, a step portion 11d having a cylindrical surface to which the inner ring of the second bearing 13 is fitted is provided at the outer circumferential surface of the shaft member 11 adjacent the rear end of the conical outer circumferential surface 11a.

A cam ring 15 having an approximately cylindrical shape is fitted to the outer circumferential surface of the shaft member 11 between the flange portion 11b and the step portion 11c. The rear end of the cam ring 15 is V-shaped (convex) and constituted by cam surfaces 15a, 15a which are fitted in the concave front end portion of the cylinder member 10 in contact with cam surface 10h, 10h. The front end of the cam ring 15 is conical, i.e. is defined by inclined surface 15b projecting axially rearwardly toward a vertex diametrical of the rear end of the cam ring 15.

The cam ring 15 has holes 15c, 15c elongate axially along lines that intersect the vertex of the convex rear end of the cam ring at the intersection of the cam surfaces 15a, 15a. Each of these elongate holes 15c, 15c has a key 16 fitted therein, the key 16 being secured to the outer circumferential surface of the shaft member 11. The key 16 allows the cam ring 15 to move only in the axial direction.

The outer circumferential surface of the shaft member 11 includes a conical surface, i.e. an inclined surface 11e, at the rear end thereof. The inclined surface 11e projects axially forward, as opposed to the inclined surface 15b of the cam ring 15.

Between the inclined surface 11e of the shaft member 11 and the inclined surface 15b of the cam ring 15 are fitted semicircular adjusting rings 17, 17. The front and rear ends of each of the adjusting rings 17, 17 are defined by an inclined surface 17c contacting the inclined surface 11e and an inclined surface 17d contacting the inclined surface 15b, respectively.

A bolt 18 and nut 19 are attached to opposing projections 17e, 17e of the adjusting rings 17, 17. The axial position of the cam ring 15 can be adjusted by enlarging or reducing the inner and outer diameters of the adjusting rings 17, 17 by tightening or loosening the bolt 18.

According to the above-described arrangement, when the torque limiter is set up, the conical outer circumferential surface 11a of the shaft member 11 is fitted to the conical inner circumferential surface 10a of the cylinder member 10. Oil is supplied under pressure to the hydraulic slit 10e through the inlet of the hydraulic passage 10f, so that the conical inner circumferential surface 10a of the cylinder member 10 is urged against the conical outer circumferential surface 11a of the shaft member 11. As a result, the cylinder member 10 and the shaft member 11 are frictionally coupled. When this initial setting procedure has been completed, the inlet of the hydraulic passage 10f is closed by the plug member 14 while the collective diameter of the adjusting rings 17, 17 is reduced to move the cam ring 15 in the axial direction. Thus, the convex end of the cam ring 15 is fitted into the corresponding concave end of the cylinder member 10 without leaving clearance therebetween.

Figure 3A:
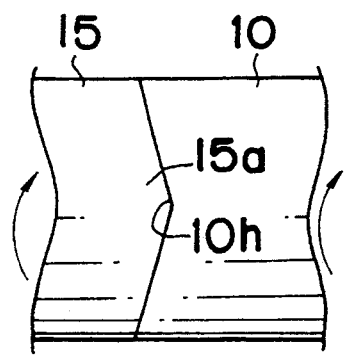
FIG. 3(A), (B) and (C) are plan views showing the relationship of rotational position between a cylinder member and a cam ring of the first embodiment.

When the torque limiter is put into operation in this state, the cylinder member 10 is rotated by the driving shaft via the coupling member. Accordingly, the shaft member 11 is rotated via the frictional coupling between the conical inner circumferential surface 10a of the cylinder member 10 and the conical outer circumferential surface 11a of the shaft member 11. Thus, the driven shaft is rotated (see FIG. 3(A)).

Figure 3B:
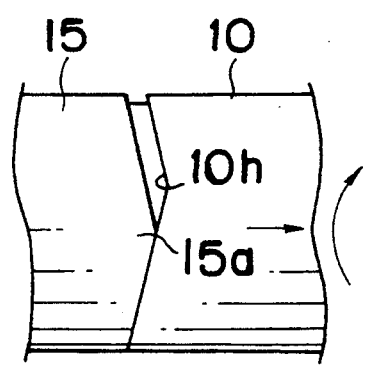
Figure 3C:
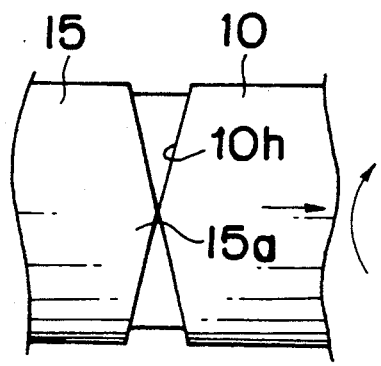

Then, if a load larger than a specified value is applied to the driven shaft, the speed of the shaft member 11 decreases or the shaft member 11 stops rotating, while the cylinder member 10 would continue rotating at its constant speed. This results in a change in the relative rotational position between the shaft member 11 and the cylinder member 10. When this occurs, the concave end of the cylinder member 10, constituted by surfaces 10h, 10h, is displaced from the convex end of the cam ring 15, constituted by surfaces 15a, 15a in the rotational direction (FIG. 3(B)). Subsequently, the cylinder member 10 is slid toward the driving shaft until the protruding end between the cam surfaces 10h, 10h of the cylinder member 10 is opposed to the vertex at which the cam surfaces 15a, 15a of the cam ring 15 intersect.

As a result, the conical inner circumferential surface 10a of the cylinder member 10 is separated from the conical outer circumferential surfaces 11a of the shaft member 11, so that the conical inner circumferential surface 10a is no longer urged against the conical outer circumferential surface 11a. Accordingly, the cylinder member 10 and the shaft member 11 are released from each other, resulting in that the torque is no longer transmitted between the cylinder member 10 and the shaft member 11.

On the other hand, at the time of restoration, the plug member 14 of the cylinder member 10 is removed, and the hydraulic slit 10e is opened to relieve the oil pressure. Thereafter, the conical outer circumferential surface 11a of the shaft member 11 is fitted to the conical inner circumferential surface 10a of the cylinder member 10, and pressure is applied again to the same oil within the hydraulic slit 10e. As a result, the conical inner circumferential surface 10a of the cylinder member 10 is urged against the conical outer circumferential surface 11a of the shaft member 11, thereby frictionally coupling the cylinder member 10 and the shaft member 11. Subsequently, the inlet of the hydraulic passage 10f is closed by the plug member 14, while the axial position of the cam ring 15 is adjusted by the adjusting rings 17, 17.

As shown above, according to the present first embodiment, in the operation of the torque limiter the plug member 14 is not cut off and oil is not discharged from the hydraulic slit 10e. Thus, there is no need to replace the plug member 14 for sealing the hydraulic slit 10e with a new one or to resupply oil to the hydraulic slit 10e at the time of restoration, unlike the conventional torque limiter in which the shear tube is cut off so that oil is discharged from the hydraulic slit.

Although the slit has been provided in the cylinder member 10 in the above-described first embodiment, it may also be provided in the shaft member, in which case the conical outer circumferential surface is urged against the conical inner circumferential surface of the cylinder member by expanding the slit. In this case, also, the same functions and effects as in the first embodiment can be achieved.

Figure 4B:
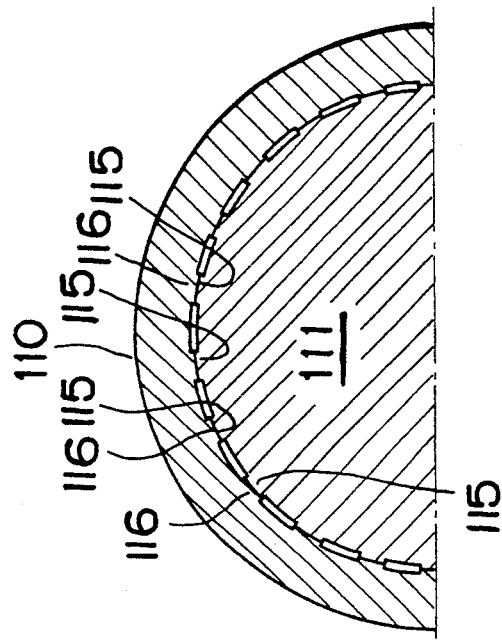
FIG. 4(B) is a sectional view taken along the line Z—Z of FIG. 4(A)
Figure 4C:
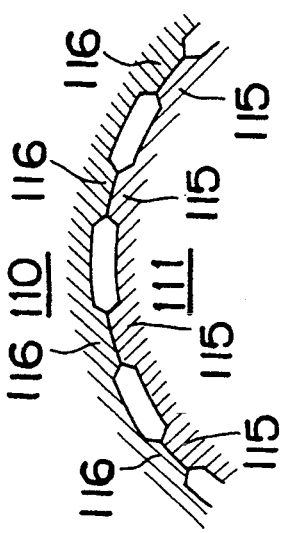
FIG. 4(C) is an enlarged view of main parts shown in FIG. 4(B)
Figure 4A:
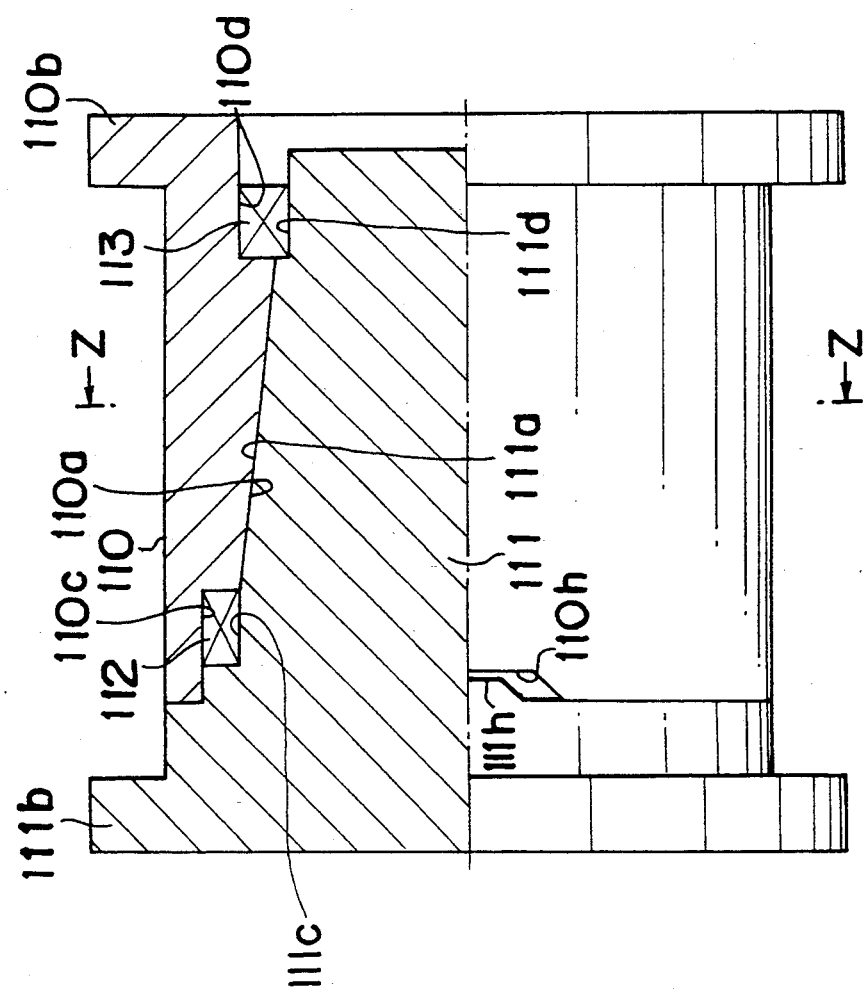
FIG. 4(A) is a longitudinal partial sectional view of a second embodiment of the torque limiter according to the present invention.

(Second Embodiment)
Referring to FIGS. 4(A), 4(B), and 4(B), a second embodiment of the torque limiter of the invention comprises a cylinder member 110 having a conical inner circumferential surface 110a, and a shaft member 111 having a conical outer circumferential surface 111a to be fitted to the conical inner circumferential surface 110a.

A flange portion 110b is provided at a rear end of the cylinder member 110 (on the right hand in FIG. 4(A)). A coupling member coupled to a driving shaft by a spline (not shown) is attached to the flange portion 110b so that the cylinder member 110 can slide in the axial direction. Further, a flange portion 111b is provided at a front end of the shaft member 111 (on the left hand side in FIG. 4(A)). A driven (not shown) is coupled to the flange portion 111b.

The diameter of the conical inner circumferential surface 110a of the cylinder member 110 decreases in a direction from a front to a rear end of the cylinder member. The inner periphery of the cylinder member 110 at the front end of the conical inner circumferential surface 110a is provided with a groove 110c defined by a cylindrical surface to which an outer ring of a first bearing 112 is fitted. The inner periphery of the cylinder member 110 at the rear end of the conical inner circumferential surface 110a is provided with a groove 110d defined by a cylindrical surface to which an outer ring of a second bearing 113 is fitted.

The diameter of the conical outer circumferential surface 111a of the shaft member 111 decreases in a direction from a front to a rear end of the shaft member and is axially fitted to the conical inner circumferential surface 110a of the cylinder member 110. Further, the outer circumferential surface 111a of the shaft member 111 has a stepped portion 111c at the front end thereof. The stepped portion 111c includes a cylindrical surface to which an inner ring of the first bearing 112 is fitted. The outer circumferential surface 111a of the shaft member 111 has another stepped portion 111d at the rear end thereof. The stepped portion 111d has a cylindrical surface to which an inner ring of the second bearing 113 is fitted.

The bearings 112 and 113 are so constructed that only their outer ring and rolling elements are separated from the inner ring so as to be axially movable along with the cylinder member 110.

As shown in FIG. 4(B), which is a sectional view taken along line Z—Z of FIG. 4(A), the shaft member 111 has a plurality of convex portions 115, 115 at the outer periphery thereof. The convex portions have top surfaces extending along a cone, such that the conical outer circumferential surface 111a has an overall generally conical shape. The convex portions 115 are spaced from each other in the circumferential direction of surface 111a. Further, the cylinder member 110 has a plurality of convex portions 116, 116 at the inner periphery thereof. The convex portions have top surfaces extending along a cone such that the conical inner circumferential surface 110a has an overall conical shape. Convex portions 116 are spaced from other of surface 110a. The top surfaces of the convex portions 115 forming part of the conical outer circumferential surface 111a and the top surfaces of the convex portions 116 forming part of the conical inner circumferential surface 110a form frictional coupling portions.

The front end of the cylinder member 110 includes a concave cam portion 110h having a trapezoidal shape. Also, the front end of the shaft member 111 includes a convex cam portion 111h having a trapezoidal shape. The concave cam portion 110h and convex cam portion 111h are spaced a predetermined distance in the circumferential direction.

When the torque limiter is set up, the conical outer circumferential surface 111a of the shaft member 111 is pressed into the conical inner circumferential surface 110a of the cylinder member 110, whereby the top surfaces of the convex portions 115, 115 forming part of the conical outer circumferential surface 111a and the top surfaces of the convex portions 116, 116 forming part of the conical inner circumferential surface 110a are urged against each other, as shown in FIG. 4(C). As a result, the cylinder member 110 and the shaft member 111 are frictionally coupled. The force at which these convex portions 115 and convex portions 116 are urged against each other establishes an initial setting of transmitting torque.

When the torque limiter is put into operation in this state, the cylinder member 110 is rotated by the driving shaft via the coupling member. Accordingly, the shaft member 111 is rotated by the frictional coupling between the convex portions 116 forming part of the conical inner circumferential surface 110a of the cylinder member 110 and the convex portions 115 forming part of the conical outer circumferential surface 111a of the shaft member 111. As a result, the driven shaft is rotated.

Then, for example, if a load above a specified value is applied to the driven shaft, the speed of the shaft member 111 decreases or the shaft member 111 stops rotating, while the cylinder member 110 continues rotating at its constant speed. This results in a change in the relative rotational position between the shaft member 111 and the cylinder member 110. When this occurs, as shown in FIG. 5(B), the relative rotational position between the convex portions 115 of the shaft member 111 and the convex portions 116 of the cylinder member 110 changes, with the convex portions 115 becoming opposed to the concave portions between the convex portions 116, 116. As a result, the convex portions 115 and the convex portions 116 are released from each other, whereby the cylinder member 110 and the shaft member 111 are no longer frictionally coupled. Therefore, the torque is no longer transmitted between the cylinder member 110 and the shaft member 111.

Figure 5B:
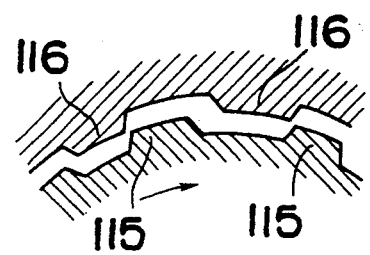
Figure 5C:
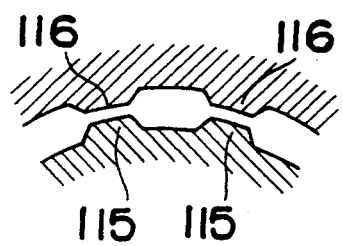
Figure 6A:
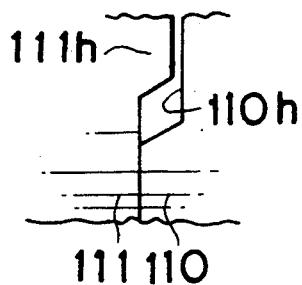
FIGS. 6(A), (B), and (C) are views showing the operation of cams of the second embodiment in a released state.
Figure 6B:
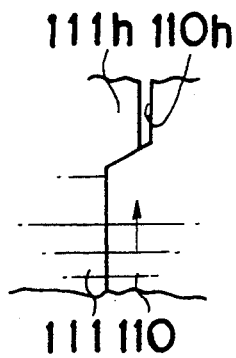
Figure 6C:
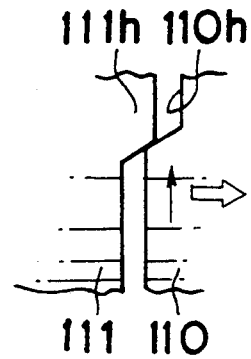

When the relative rotational position between the cylinder member 110 and the shaft member 111 has further changed, as shown in FIGS. 6(B) and 6(C), inclined faces of the concave cam portion 110h of the cylinder member 110 and the convex cam portion 11h of the shaft member 111 slide over each other. Thus, the shaft member 111 and the cylinder member 110 are slid away from each other in the axial direction. While the shaft member 111 and the cylinder member 110 are sliding relatively to each other in the axial direction as described above, each of the convex portions 115 is opposed to a concave portion between the convex portions 116, 116, as shown in FIG. 5(B). Therefore, there is no friction between the shaft member 111 and the cylinder member 110, whereby the shaft member 11 slides smoothly relative to the cylinder member 110. Further, when the top surfaces of the convex portions 115 forming part of the conical outer circumferential surface 111a and the top surfaces of the convex portions 116 forming part of the conical inner circumferential surface 110a do become opposed to each other, they are separated from other in the radial direction as shown in FIG. 5(C). As a result, the cylinder member 110 and the shaft member 111 assume an idle state.

On the other hand, at the time of restoration, the conical outer circumferential surface 111a of the shaft member 111 is fitted to the conical inner circumferential surface 110 of the cylinder member 110 so that the convex portions 115 of the conical outer circumferential surface 111a and the convex portions 116 of the conical inner circumferential surface 110a are urged against each other as radially opposed to each other. As a result, the cylinder member 110 and the shaft member 111 are frictionally coupled.

As shown above, according to the above-described second embodiment, there is no need to replace the plug member or resupply oil at the time of restoration, unlike the conventional torque limiter in which the shear tube is cut off so that oil is discharged from the hydraulic slit.

Further, when the cylinder and shaft members are uncoupled, the convex portions 116 of the conical inner circumferential surface 110a of the cylinder member 110 and the convex portions 115 of the conical outer circumferential surface 111a of the shaft member 111 are no longer frictionally coupled, whereby the cylinder member 110 and the shaft member 111 are separated. Thereafter, the concave cam portion 110h of the cylinder member 110 and the convex cam portion 111h of the shaft member 111 engage each other at their inclined side faces and are slid apart in the axial direction. Accordingly, in this embodiment the concave cam portion 110h and the convex cam portion 111h are not subject to any excessive load when the cylinder and shaft members are uncoupled. Consequently, the concave cam portion 110h and the convex cam portion 111h are prevented from being damaged.

(Third Embodiment)

Figure 7B:
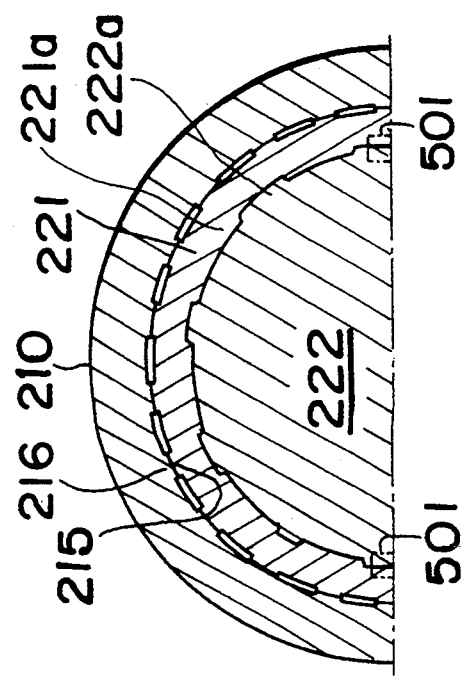
FIG. 7(B) is a sectional view taken along the line Y—Y of FIG. 7(A)
Figure 7C:
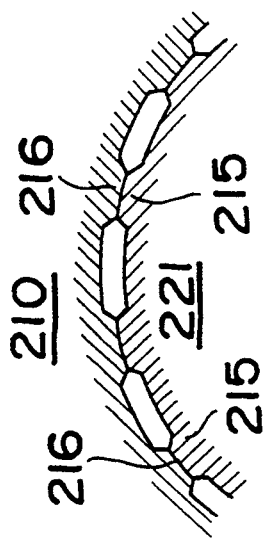
FIG. 7(C) is an enlarged view of main parts shown in FIG. 7(B)
Figure 7A:
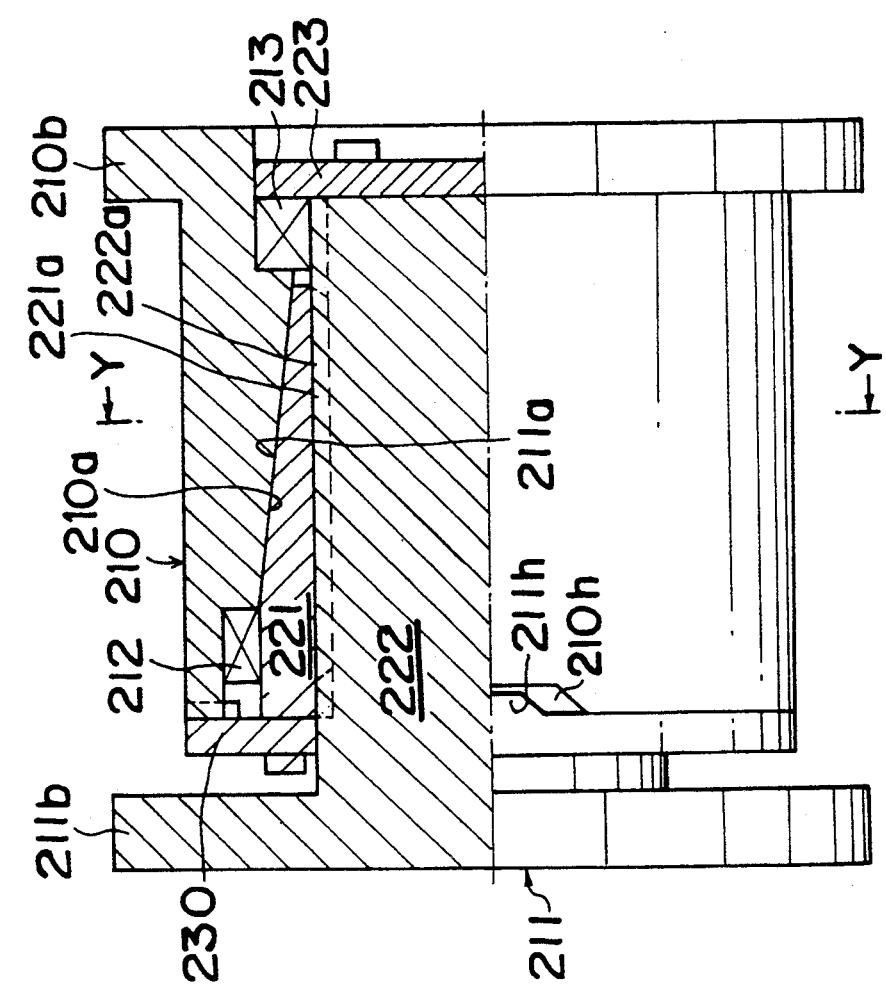
FIG. 7(A) is a longitudinal partial sectional view of a third embodiment of the invention.

A third embodiment of the present invention is shown in FIGS. 7(A), (B), and (C). This third embodiment differs from the foregoing second embodiment only with respect to the shaft member.

Specifically, the shaft member 211 of the third embodiment comprises an inner shaft portion 222, and an outer shaft portion 221 which is supported so as to be axially slidable and non-rotatable relative to the inner shaft portion 222 by a spline 222a provided at the outer periphery of the inner shaft portion 222 fitted to a spline 221a provided at the inner periphery of the outer shaft portion 221. Alternatively, the splines 222a and 221a may be omitted, and the inner shaft portion 222 and the outer shaft portion 21 may be made axially slidable and non-rotatable relative to each other by means of a key 501 shown by the imaginary lines. A retaining member 223 is bolted to a rear end of the inner shaft portion 222 of the shaft member 211 (on the right hand side in FIG. 7(A)), to prevent a cylinder member 210 and a bearing 213 from sliding axially backward relative to the inner shaft portion 222.

Also, top surfaces of convex portions 215 form a conical outer circumferential surface 211a of the outer shaft portion 221. These convex portions 215 are frictionally coupled to convex portions 216 forming a conical inner circumferential surface 210a of the cylinder member 210. Further, a convex cam portion 211h having inclined side faces is formed on a flange 230 fixed on the front end of the outer shaft portion 221 (on the left hand side in FIG. 7(A)).

According to the third embodiment, when the relative rotational position between the cylinder member 210 and the shaft member 211 has changed, the convex portions 216 of the cylinder member 210 and the convex portions 215 of the shaft member 211 are separated so as to no longer be frictionally coupled, as in the second embodiment. Then, when the convex cam portion 211h of the shaft member 211 and the concave cam portion 210h of the cylinder member 210 are rotated into contact with each other, they are slid axially apart so that the outer shaft portion 221 of the shaft member 211 is slid forward relative to the cylinder member 210. While this occurs, the inner shaft portion 222 of the shaft member 211 will not slide forward relative to the cylinder member 210 due to the presence of the retaining member 223. As a result, according to this embodiment, the spacing between the flange portion 210b of the cylinder member 210 and the flange portion 211b of the shaft member 211 remains unchanged when the cylinder member 210 and shaft member 211 become uncoupled.

(Fourth Embodiment)

Figure 8:
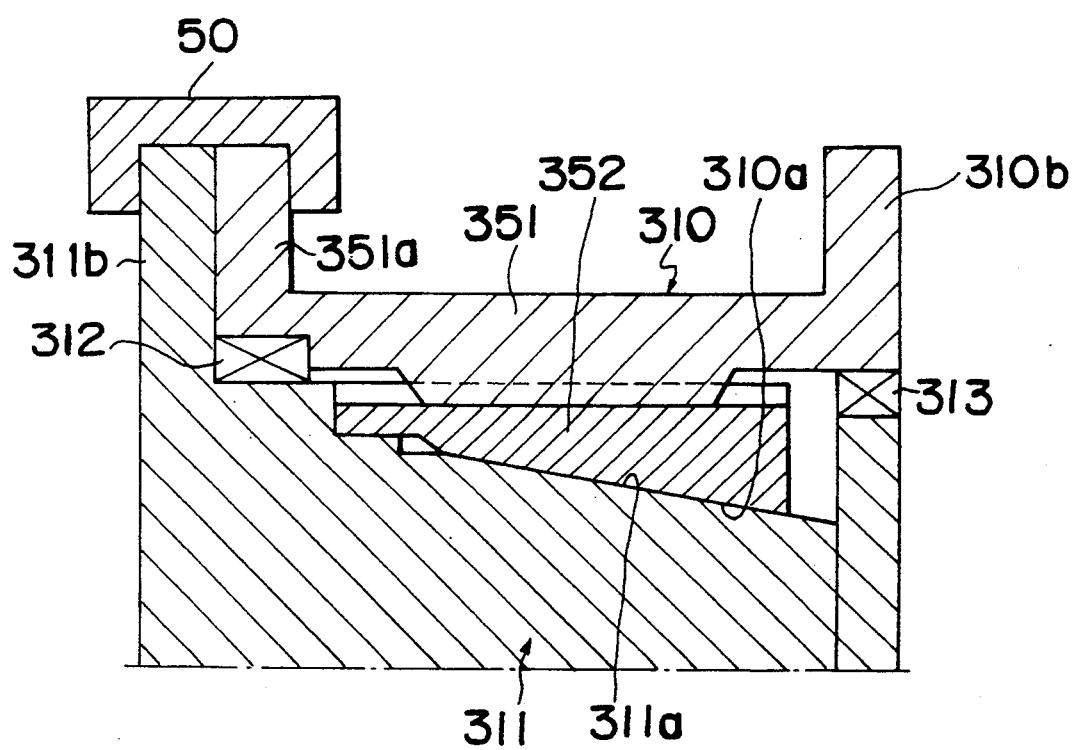
FIG. 8 is a longitudinal sectional view of a fourth embodiment of the present invention.
Figure 9:
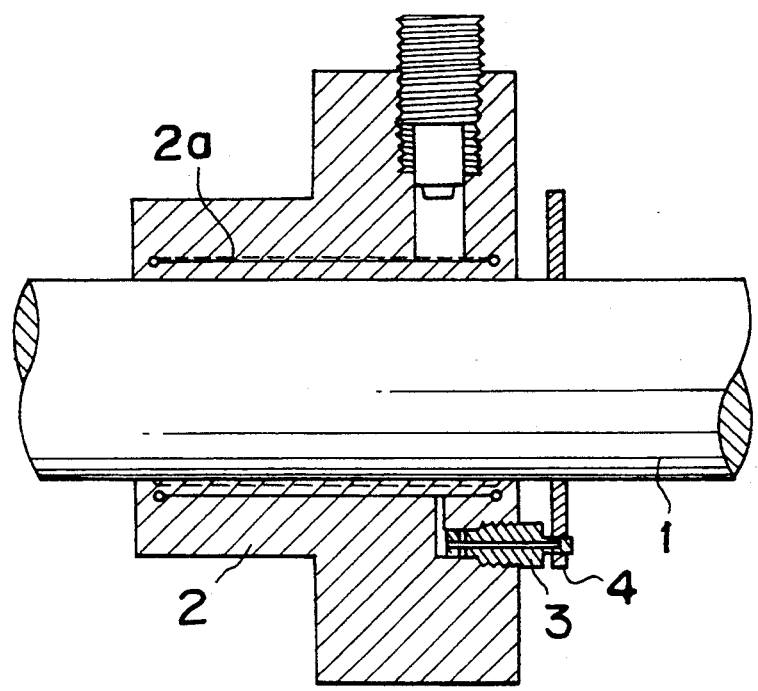
FIG. 9 is a sectional view of a conventional torque limiter.

FIG. 8 illustrates a fourth embodiment of the present invention. This embodiment comprises a cylinder member 310 comprising an outer cylinder portion 351 and an inner cylinder portion 352, and a shaft member 311 having a conical outer circumferential surface 311a. The outer cylinder portion 351 and the inner cylinder portion 352 of the cylinder member 310 are splined to each other, both being axially slidable but non-rotatable relative to each other. A fitting member 50 having a U-shaped section is fitted to a flange 351a of a front end (left hand side in FIG. 8) of the outer cylinder portion 351 of the cylinder member 310 and to a flange 311b of the shaft member 311, so that the flange portions 310a and 311b are relatively rotatable and relatively axially non-movable to each other. The inner circumferential surface 310a of the inner cylinder portion 352 of the cylinder member 310 is a conical surface whose diameter decreases rearwardly (to the right in FIG. 8). Further, as in the second embodiment shown in FIGS. 4(B) and (C), the conical inner circumferential surface 310a of the inner cylinder portion 352 and the conical outer circumferential surface 311a of the shaft member 311 are formed of top surfaces of convex portions extending axially (not shown). Also, as in the second embodiment, bearings 312 and 313 are disposed between both ends of the inner circumferential surface of the outer cylinder portion 351 of the cylinder member 310 and the shaft member 311. Furthermore, although not shown, a concave cam portion identical to that of the second embodiment is formed on a front end of the inner cylinder portion 352, while a convex cam portion identical to that of the second embodiment is formed on a front end of the shaft member 311.

Figure 5A:
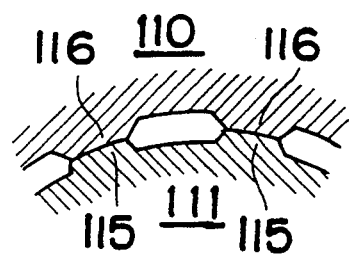
FIGS. 5(A), (B), and (C) are sectional views for explaining the operation of the second embodiment in a released state.

According to the fourth embodiment, when the relative rotational position between the cylinder member 310 and the shaft member 311 has changed, the convex portions of the conical inner circumferential surface 310a of the inner cylinder portion 352 of the cylinder member 310 and the convex portions of the conical outer circumferential surface 311a of the shaft member 311 are separated so as to be no longer frictionally coupled, in the manner shown in FIGS. 5(A), (B), and (C) with respect to the second embodiment. Then, when the convex cam portion of the shaft member 311 and the concave cam portion of the inner cylinder portion 352 of the cylinder member 310 are brought into contact with each other, the inner cylinder portion 352 of the cylinder member 310 is slid rearwardly (to the right in FIG. 8) relative to the shaft member 311. However, as the outer cylinder portion 351 of the cylinder member 310 is secured to the shaft member 311 by the fitting member 50, the outer cylinder portion 351 will not slide rearwardly relative to the shaft member 311. As a result, according to the fourth embodiment, the spacing between the flange portion 310b of the cylinder member 310 and the flange portion 311b of the shaft member 311 is maintained when the cylinder member 310 is released from the shaft member 311.

Although in the second to fourth embodiments the frictional coupling portions are frictionally coupled by pressing the shaft member 11, 211, or 311 into the cylinder member 10, 210, or 310, the frictional coupling may alternatively be established by shrink-fitting the shaft member to the cylinder member. It is also possible to provide the cylinder member or the shaft member with a hydraulic extension chamber that can be expanded to establish the frictional coupling of the frictional coupling portions.

As is apparent from the foregoing description, in the torque limiter of the second to fourth embodiments, a conical outer circumferential surface of a shaft member is fitted to a conical inner circumferential surface of a cylinder member so that convex portions serving as frictional coupling portions of the shaft member and convex portions serving as frictional coupling portions of the cylinder member are urged against each other. As a result, the cylinder member and the shaft member are frictionally coupled. When the relative rotational position between the cylinder member and the shaft member has changed, the convex portions are released from each other and, as a result, the cylinder member and the shaft member are no longer frictionally coupled. Subsequently, at least one of the cylinder member and the shaft member is slid axially by cams of the cylinder member and the shaft member, whereby the cylinder member and the shaft member are put into idle rotation. As a result, the torque is no longer transmitted between the cylinder member and the shaft member.

As shown above, according to the second to fourth embodiments of the present invention, there is no need to replace the member plugging up the hydraulic slit or other parts and there is no need to resupply the hydraulic slit with oil, unlike the conventional torque limiter in which the shear tube is cut off so that oil is discharged upon the operation of the torque limiter.

Further, after the cylinder member and the shaft member are no longer frictionally coupled, the cylinder member or the shaft member is made to slide in the axial direction by the cams. As a result, the cylinder member and the shaft member are put into idle rotation. Due to this arrangement, in these embodiments, the cams not subject to any excessive load, whereby the cams are prevented from being damaged during the operation of the torque limiter.

Furthermore, when the shaft member comprises an inner shaft portions whose axial position is fixed relative to the cylinder member, and an outer shaft portion which is slidable and non-rotatable relative to the inner shaft portions, and when the top surfaces of the convex portions form part of the outer circumferential surface of the outer shaft portion, the relative axial position between the inner shaft portion of the shaft member and the cylinder member is maintained upon the operation of the torque limiter. Therefore, if a flange is provided at one end of the inner shaft portion of the shaft member and a flange is provided at the other end of the cylinder member, the spacing between the two flanges is maintained upon the operation of the torque limiter.

On the other hand, when the cylinder member comprises an outer cylinder portion whose axial position is fixed relative to a shaft member, and an inner cylinder portion which is slidable and non-rotatable relative to the outer cylinder portion, and when top surfaces of convex portions form part of the inner circumferential surface of the inner cylinder portion, the relative axial position between the outer cylinder portion of the cylinder member and the shaft member is maintained upon the operation of the torque limiter. Accordingly, if a flange is provided at one end of the outer cylinder portion of the cylinder member and a flange is provided at the other end of the shaft member, the spacing between the two flanges is maintained upon the operation of the torque limiter.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims.

What is claimed is:

1. A torque limiter comprising:
   a shaft member having a conical outer circumferential surface;
   a cylinder member having a conical inner circumferential surface frictionally couplable to the conical outer circumferential surface of the shaft member and being fitted to the outer circumference of the shaft member, and a slit which is located radially outwardly of the conical inner circumferential surface of the cylinder member, and which, when supplied with oil under pressure, expands so that the conical inner circumferential surface is urged against the conical outer circumferential surface of the shaft member; and
   each of the shaft member and the cylinder member having a respective cam, the cams of the shaft member and cylinder member being in an engagement which causes the shaft member and the cylinder member to relatively slide apart from one another in the axial direction of the torque limiter when the cylinder member is rotated relative to the shaft member, thereby causing the conical outer circumferential surface of the shaft member and the conical inner circumferential surface of the cylinder member to become separated from each other in the radial direction of the torque limiter.

2. A torque limiter comprising:
   a shaft member having a plurality of convex portions at the outer periphery thereof, said convex portions having top surfaces extending along a cone such that the outer circumferential surface of the shaft member has an overall generally conical shape, and said convex portions being regularly spaced from each other in the circumferential direction of the conical outer circumferential surface;
   a cylinder member having a plurality of convex portions at the outer periphery thereof, said convex portions of the cylinder member having top surfaces extending along a cone such that the inner circumferential surface of the cylinder member has an overall conical shape, and the convex portions of said cylinder member being regularly spaced from each other in the circumferential direction of the conical inner circumferential surface;
   the convex portions of the shaft member and the convex portions of the cylinder member being radially opposed and urged against each other, thus forming frictional coupling portions at which the shaft member and the cylinder member are frictionally coupled; and
   each of the shaft member and the cylinder member having a respective cam, the cams of the shaft member and the cylinder member being in an engagement which, after the frictional coupling portions are released from each other by rotation of the cylinder member relative to the shaft member and when the cylinder member is further rotated relative to the shaft member, causes the cylinder member and the shaft member to be relatively slid apart from one another so that the convex portions of the shaft member and the convex portions of the cylinder member are separated from each other in the radial direction of the torque limiter.

3. A torque limiter as claimed in claim 2, wherein the shaft member comprises an inner shaft portion which is rotatable relative to the cylinder member and immovable in the axial direction of the shaft member relative to the cylinder member, and an outer shaft portion which is fitted around the inner shaft portion and axially slidable and non-rotatable relative to the inner shaft portion, and wherein said convex portions of the shaft member are formed on an outer periphery of the outer shaft portion and said cam of the shaft member is an integral part of the outer shaft portion.

4. A torque limiter as claimed in claim 2, wherein the cylinder member comprises an outer cylinder portion which is rotatable relative to the shaft member and immovable in the axial direction of the cylinder member relative to the shaft member, and an inner cylinder portion which is fitted in the outer cylinder member and axially slidable and non-rotatable relative to the outer cylinder portion, and wherein said convex portions of the cylinder member are formed on an inner periphery of the inner cylinder portion and said cam of the cylinder member is an integral part of the inner cylinder portion.

* * * * *